United States Patent Office 3,769,205
Patented Oct. 30, 1973

3,769,205
REMOVAL OF MERCURY COMPOUNDS FROM WATER
Ralph P. Williams, Bartlesville, Okla., assignor to Phillips Petroleum Company
No Drawing. Filed June 20, 1972, Ser. No. 264,583
Int. Cl. B01d *11/04;* C01g *13/00*
U.S. Cl. 210—21    6 Claims

ABSTRACT OF THE DISCLOSURE

Mercury compounds can be removed from aqueous solutions by extracting the solution with water insoluble organic sulfides or disulfides, including mixtures thereof. The insoluble organic phase can be readily separated from the aqueous phase.

BACKGROUND OF THE INVENTION

This invention relates to a process for removing mercury compounds from aqueous solutions.

Mercury compounds present in industrial effluent pose a threat to the environment. For example, in natural waterways, inorganic mercury compounds can be converted biologically to highly toxic dimethyl mercury which can be ingested by fish which are ultimately consumed by human beings. Therefore, in order to avoid the contamination of waterways into which an aqueous industrial effluent containing dissolved mercury compounds is discharged, the best course is to remove the mercury contaminant prior to the discharge.

SUMMARY OF THE INVENTION

It is an object of this invention to provide a process for removing mercury compounds from water.

In accordance with this object, I have found that by contacting an aqueous mixture contaminated by dissolved mercury compounds with a water insoluble organic sulfide or disulfide, preferably a hydrocarbyl sulfide or disulfide, all but minor amounts of the mercury contaminant can be removed from the water. The organic layer can be separated from the water layer. If desired, mixtures of one or more sulfides or disulfides or a mixture of a sulfide and disulfide may be employed as the extraction agent.

DESCRIPTION OF THE PREFERRED EMBODIMENTS

I have discovered that mercury compounds soluble in water can be removed therefrom by extraction with one or more members of the group consisting of water insoluble organic sulfides and disulfides and mixtures thereof. Using this process, all but trace amounts of the contaminant mercury compound can be removed from the water so treated.

Although I refer to the inventive process as an extraction, I do not intend to imply that any particular physical phenomenon effects the removal of the dissolved mercury contaminant. It is my belief that the sulfide or disulfide forms a complex with the mercury compound that is insoluble in water but soluble in the organic phase. However, I do not intend my invention to be limited to such a mechanism of mercury removal.

In general, any organic sulfide or disulfide that is insoluble in water can be employed in the process of this invention. Normally, however, the readily available hydrocarbyl sulfides and disulfides would be chosen for use in this invention. Suitable acyclic sulfides and disulfides can be described, respectively, by the formula R—S—R and R—S—S—R wherein R can be alkyl, cycloalkyl, aryl, alkylthioalkyl or combinations thereof and the extractant compound can contain 2 to 24 carbon atoms. Suitable cyclic sulfides and disulfides are described by the formula

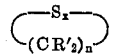

wherein $x$ is an integer having the value 1 or 2, and $R'$ can be hydrogen or alkyl having 1 to 4 carbon atoms and $n$ is an integer from 3 to 5.

Representative sulfides and disulfides suitable for use in the invention include dimethyl sulfide, di-n-propyl sulfide, di-n-butyl sulfide, methyl-n-butyl sulfide, diethyl disulfide, di-tert-dodecyl sulfide, n-butyl tert-dodecyl sulfide, di-tert-dodecyl disulfide, di-n-butyl disulfide, n-butyl cyclohexyl sulfide, dicyclohexyl sulfide, dicyclohexyl disulfide, n-butyl phenyl sulfide, di(phenylethyl) sulfide, di-tert-octyl sulfide, diphenyl sulfide, 3,6-dithiaoctane, phenyl cyclohexyl sulfide, 6,9-dithiatetradecane, benzyl cyclohexyl disulfide, di-tert-octyl disulfide, diisobutyl sulfide, n-octadecyl ethyl sulfide, 2,2,7,7-tetramethyl-3,6-dithiaoctane, 12,15-dithiahexacosane, thiacyclobutane, thiacyclopentane, thiacyclohexane, 2-methylthiacyclopentane, 2,2-diethylthiacyclohexane, 2-n-butylthiacyclopentane, 2-n-propylthiacyclobutane, and the like.

It is presently preferred to employ alkyl sulfides and disulfides having 4–12 carbon atoms. A particularly preferred alkyl sulfide is di-n-butyl sulfide. A particularly preferred alkyl disulfide is di-n-butyl disulfide.

It is within the scope of this invention to use a mixture of sulfides and disulfides including mixtures of one or more sulfides with one or more disulfides. A particularly suitable mixture is one derived from the kettle residue obtained in the synthesis butyl mercaptan. It comprises a major portion of di-n-butyl sulfide and a minor portion of di-n-butyl disulfide.

The mercury compounds which can be removed from water using the process of this invention include water soluble compounds of mercury wherein mercury has a valence of $+1$ (mercurous compounds) or $+2$ (mercuric compounds). Such compounds include the water soluble mercury salts of inorganic and organic acids. Examples of such compounds include the mercurous and mercuric salts of hydrogen chloride, hydrogen bromide, hydrogen iodide, acetic acid and the like.

The actual process of extracting the mercury compound from an aqueous mixture can be conveniently carried out in many ways; it is not limited to a specific technique. Suitable techniques include continuous extraction using a liquid-liquid extraction apparatus such as a counter current extractor. However, it is presently preferred to use a batch technique whereby a quantity of an aqueous mixture is contacted with the extracting agent and the mixture agitated to insure maximum contact of the two phases. After a suitable period of quiescence, the layers can be separated, usually by drawing off a more dense aqueous layer. Although a single extraction can significantly reduce the residue of mercury contaminant in the aqueous phase, plural contactings of the aqueous layer with as many portions of extractant as necessary to reduce the level of mercury to that desired is preferred for best results.

The ratio of extraction agent to aqueous material giving optimum purification can readily be determined by one skilled in the art. Normally contacting the aqueous material with 5–75% by volume of extracting agent will be satisfactory. In order to achieve adequate removal of mercury contaminant while avoiding the need of handling large quantities of the sulfide or disulfide, it is preferred to employ 10–30% by volume of extracting agent.

The extraction can be carried out over a wide temperature range. A temperature varying from about 5–75° C.

will usually be suitable. For convenience it is preferred to carry out the extraction at about 25° C. or room temperature. The process may be carried out at any convenient pressure. In the preferred batch technique sufficient pressure should be maintained to insure the extractant and aqueous phase remain substantially in the liquid phase. Atmospheric pressure is preferred.

The contacting time required for most efficient separation can be readily determined by routine experimentation. I have found that successive extractions of an aqueous solution of mercuric or mercurous chloride with a 20 percent by volume quantity of either di-n-butyl sulfide, di-n-butyl disulfide or a mixture of both is effective.

Experimental

In order to demonstrate the effectiveness of this invention, standardized solutions of mercuric chloride (14,000 p.p.m.) and mercurous chloride (3.45 p.p.m.) in deionized water were prepared and submitted to successive extractions with di-n-butyl sulfide, di-n-butyl disulfide and a mixture containing both. The mixture is obtained as a kettle bottom concentrate in the commercial synthesis of n-butyl mercaptan. That mixture, termed di-n-butyl sulfide concentrate, had the following analysis:

Components: Wt. percent
Lights ---------------------------------- 4.5
Di-n-butyl sulfide ----------------------- 87.9
Di-n-butyl disulfide --------------------- 3.6
Unidentified heavies --------------------- 3.2
Specific gravity, 0.8481.
Mercaptan sulfur, 0.78 wt. percent.

The extractions were carried out at 25° C. by stirring the aqueous solution of the mercury salt with 20 percent by volume of the extracting agent for thirty minutes. After a quiescent period during which the layers separated, an aliquot of the aqueous phase was removed and analyzed by atomic absorption spectroscopy. Deionized water was used to minimize background absorption by other materials present in distilled water and thus simplify analysis. In order to obtain reproducible analyses all glassware was cleaned with sodium dichromate cleaning solution prior to use. The results of these extractions are summarized below.

TABLE I.—RESIDUAL MERCURY VALUES IN AQUEOUS MERCURIC CHLORIDE SOLUTIONS

| Original mercury value (p.p.m.) | No. of extractions | Extracting agent | Residual mercury values (p.p.m.) |
|---|---|---|---|
| 14,000 | 0 | di-n-Butyl sulfide | 14,000 |
|  | 1 | do | 86.6 |
|  | 2 | do | 2.52 |
|  | 3 | do | 0.40 |
| 14,000 | 0 | do.[1] | 14,000 |
|  | 1 | do.[1] | 62.2 |
|  | 2 | do.[1] | 0.2 |
|  | 3 | do.[1] | 0.13 |
| 14,000 | 0 | di-n-Butyl disulfide | 14,000 |
|  | 1 | do | 11,200 |
|  | 2 | do | 9,600 |
|  | 3 | do | 8,600 |

[1] Concentrate.

The above data show that di-n-butyl sulfide concentrate was somewhat more effective than di-n-butyl sulfide in removing mercury from aqueous mercuric chloride solution. The di-n-butyl disulfide was least effective in removing mercury from aqueous mercuric chloride.

TABLE II.—RESIDUAL MERCURY VALUES IN AQUEOUS MERCUROUS CHLORIDE SOLUTIONS

| Original mercury value (p.p.m.) | No. of extractions | Extracting agent | Residual mercury values (p.p.m.) |
|---|---|---|---|
| 3.45 | 0 | di-n-Butyl sulfide | 3.45 |
|  | 1 | do | 0.066 |
|  | 2 | do | 0.0078 |
|  | 3 | do | 0.0029 |
| 3.45 | 0 | do.[1] | 3.45 |
|  | 1 | do.[1] | 0.15 |
|  | 2 | do.[1] | 0.015 |
|  | 3 | do.[1] | 0.011 |
| 3.45 | 0 | di-n-Butyl disulfide | 3.45 |
|  | 1 | do | 0.11 |
|  | 2 | do | 0.025 |
|  | 3 | do | 0.026 |

[1] Concentrate.

The above data show that di-n-butyl sulfide was somewhat more effective than di-n-butyl sulfide concentrate in removing mercury from aqueous mercurous chloride solution. The di-n-butyl disulfide was least effective in removing mercury from aqueous mercurous chloride.

Although the process of my invention can be employed to remove mercury compounds from any aqueous mixture, it is best suited for treating industrial effluents prior to their discharge into a water way. Normally the process will be employed after all the commercially desirable components have been retrieved from the stream to be treated.

After segregation of the extractant from the now essentially mercury free aqueous stream, the extractant can be distilled for recycle to the purification step. A residue of the distillation is comprised of the mercury components removed and extractant in an apparently complexed form the nature of which is not known. At temperatures elevated above the boiling point of the extractant the complex can be caused to decompose leaving as a residue mercury values that would otherwise be lost.

I claim:

1. A process for removing mercury from an aqueous solution containing water soluble mercurous or mercuric compounds dissolved therein which comprises extracting said mercury compounds from said solution by contacting with an extractant selected from the group consisting of water insoluble organic sulfides and disulfides represented by the formulas R—S—R, R—S—S—R, wherein R can be alkyl, cycloalkyl, aryl, alkylthioalkyl or combinations thereof and wherein the extractant compound contains 2 to 24 carbon atoms, and

wherein $x$ is an integer having the value 1 or 2, $n$ is an integer having the value 3 to 5 and R' can be hydrogen or alkyl having 1–4 carbons, and mixtures thereof, wherein an organic layer comprising extractant and extracted mercury compounds is formed and separating said organic layer from the aqueous phase.

2. A process according to claim 1 wherein the extractant is separated from the organic phase and reused as extractant for said contacting.

3. A process according to claim 1 wherein the aqueous solution and extractant are agitated during said contacting and then allowed under quiescent conditions to separate into an organic phase comprising extractant and extracted mercury compounds and an aqueous phase and the organic phase is separated from the aqueous phase and the extractant recovered therefrom.

4. A process according to claim 1 wherein the extractant is selected from di-n-butyl sulfide, di-n-butyl disulfide and a mixture comprising a major portion of di-n-butyl sulfide and a minor portion of di-n-butyl disulfide and the mercury compound is selected from mercurous chloride and mercuric chloride.

5. A process according to claim 1 wherein the volume of extractant is from 5–75 volume percent of the aqueous solution.

6. A process according to claim 5 wherein the volume of extracting agent is from 10–30 volume percent of the aqueous solution.

References Cited

UNITED STATES PATENTS

| | | | |
|---|---|---|---|
| 3,432,257 | 3/1969 | Spitzer | 23—312 R |
| 3,674,428 | 7/1972 | Dean | 210—50 |

FOREIGN PATENTS

| | | | |
|---|---|---|---|
| 980,220 | 1/1965 | Great Britain | 23—312 R |

OTHER REFERENCES

Nuclear Science Abstracts, vol. 15, No. 19, Oct. 15, 1961, Ruzicke et al., p. 3205.

Nuclear Science Abstracts, vol. 18, No. 5, Mar. 15, 1964, Handley, p. 909.

Nuclear Science Abstracts, vol. 20, No. 1, Jan. 15, 1966, Elliott et al., p. 38.

Nuclear Science Abstracts, vol. 15, No. 4, Feb. 28, 1961, Handley et al., p. 529.

ANL–7321 (TID–4500) Separation of Traces of Metal Ions From Sodium Matrices, Korbisch, pp. 1–7, February 1968.

Nuclear Science Abstracts, vol. 23, No. 21, Nov. 15, 1969, paragraph 43382, pp. 4428–4429.

Reid, Organic Chemistry of Bivalent Sulfur, vol. II, 1960, pp. 52 to 54.

Nuclear Science Abstracts, vol. 25, No. 23, Dec. 15, 1971, Bock et al., pp. 5355–5356.

Nuclear Science Abstracts, vol. 19, No. 11, June 15, 1965, Elliott, p. 2422.

Nuclear Science Abstracts, vol. 18, No. 19, Oct. 15, 1964, Marecek et al., p. 4494.

Nuclear Science Abstracts, vol. 22, No. 12, June 30, 1968, Korkisch et al., p. 2385.

NORMAN YUDKOFF, Primary Examiner

S. J. EMERY, Assistant Examiner

U.S. Cl. X.R.

423—100; 210—38; 75—121